US010889222B2

(12) United States Patent
Holm et al.

(10) Patent No.: US 10,889,222 B2
(45) Date of Patent: Jan. 12, 2021

(54) LATCHING SYSTEM FOR A VEHICLE SEAT

(71) Applicant: Polaris Industries Inc., Medina, MN (US)

(72) Inventors: Bryce A. Holm, Luck, WI (US); Craig D. Hawes, Ham Lake, MN (US)

(73) Assignee: Polaris Industries Inc., Medina, MN (US)

( * ) Notice: Subject to any disclaimer, the term of this patent is extended or adjusted under 35 U.S.C. 154(b) by 33 days.

(21) Appl. No.: 16/184,137

(22) Filed: Nov. 8, 2018

(65) Prior Publication Data

US 2020/0148084 A1    May 14, 2020

(51) Int. Cl.
*B60N 2/20* (2006.01)
*B60N 2/90* (2018.01)
*B60N 2/30* (2006.01)

(52) U.S. Cl.
CPC .............. *B60N 2/938* (2018.02); *B60N 2/20* (2013.01); *B60N 2/304* (2013.01); *B60N 2002/952* (2018.02)

(58) Field of Classification Search
CPC ........ B60N 2/919; B60N 2/929; B60N 2/933; B60N 2/938; B60N 9/028; B60N 9/20; B60N 9/206; B60N 9/3005; B60N 9/3004; B60N 9/3029; B60N 9/3038; B60N 9/304; B60N 9/3047; B60N 9/3063; B60N 9/3088; B60N 9/3093; B60N 9/0812; B60N 9/146; B60N 2002/948; B60N 2002/952; B60N 2002/967; B60N 2002/971
See application file for complete search history.

(56) References Cited

U.S. PATENT DOCUMENTS

| 3,322,461 | A | * | 5/1967 | Goldman | .................. | B60N 2/20 297/378.12 |
| 3,405,971 | A | * | 10/1968 | Kobrehel | .................. | B60N 2/20 297/378.11 |
| 3,719,379 | A | * | 3/1973 | Sigmund | .................. | B60N 2/20 297/378.12 |
| 4,252,369 | A | * | 2/1981 | Kluting | .................... | B60N 2/20 292/210 |

(Continued)

FOREIGN PATENT DOCUMENTS

| DE | 20007090 U1 | 6/2000 |
| FR | 2983136 A1 | 5/2013 |

OTHER PUBLICATIONS

International Search Report and Written Opinion dated Mar. 5, 2020 in corresponding International Application No. PCT/US2019/060327.

*Primary Examiner* — Kyle J. Walraed-Sullivan
(74) *Attorney, Agent, or Firm* — Harness Dickey

(57) ABSTRACT

A seat latching system for use in moving a movable seat portion between a first position and a second position. The seat latching system includes a first fastener that is attached to a first location and a second fastener that is attached to a second location. An elongated resilient strap extends from a first end to a second end and has a first coupling at the first end and a second coupling at the second end. The first coupling is attached to the first fastener and the second coupling is attached to the second fastener. The elongated resilient strap allows the movable seat portion to move between the first position and the second position while the strap is under tension.

14 Claims, 16 Drawing Sheets

(56) References Cited

U.S. PATENT DOCUMENTS

| | | | | |
|---|---|---|---|---|
| 5,290,089 A * | 3/1994 | Oleszko | B60N 2/231 | 297/216.1 |
| 5,393,116 A * | 2/1995 | Bolsworth | B60N 2/01583 | 296/65.03 |
| 5,553,918 A * | 9/1996 | Baret | B60N 2/3081 | 297/237 |
| 5,810,443 A * | 9/1998 | Blanchard | B60N 2/01533 | 297/378.12 |
| 5,810,444 A * | 9/1998 | Refior | B60N 2/20 | 297/378.12 |
| 6,030,042 A * | 2/2000 | Bauer | B60N 2/045 | 297/340 |
| 6,050,637 A * | 4/2000 | Hångland | B60N 2/4228 | 297/216.14 |
| 6,139,105 A * | 10/2000 | Morgos | B60N 2/20 | 297/367 R |
| 6,983,993 B2 * | 1/2006 | Hahn | B60N 2/206 | 297/378.1 |
| 7,350,844 B2 * | 4/2008 | Nemoto | B60N 2/12 | 296/65.15 |
| 7,775,597 B2 | 8/2010 | Barzen | | |
| 8,899,127 B2 * | 12/2014 | Du | A47C 1/02 | 297/41 |
| 9,033,412 B2 * | 5/2015 | Reinck | B60N 2/24 | 244/122 R |
| 9,403,447 B2 * | 8/2016 | Elton | B60N 2/2352 | |
| 2003/0042749 A1 | 3/2003 | Tourangeau et al. | | |
| 2005/0264082 A1 * | 12/2005 | Kumpf | B60N 2/015 | 297/452.1 |
| 2007/0194615 A1 * | 8/2007 | Fischer | B60N 2/02 | 297/354.12 |
| 2008/0284223 A1 * | 11/2008 | Yamada | B60N 2/3013 | 297/344.1 |
| 2008/0315654 A1 * | 12/2008 | Boudinot | B60N 2/3065 | 297/378.1 |
| 2010/0320823 A1 * | 12/2010 | Thiel | B60N 2/20 | 297/354.1 |
| 2011/0049954 A1 * | 3/2011 | Watanabe | B60N 2/20 | 297/344.1 |
| 2011/0204670 A1 * | 8/2011 | Abe | B60N 2/3013 | 296/65.09 |
| 2012/0056459 A1 * | 3/2012 | Harden | B60N 2/06 | 297/316 |
| 2012/0146379 A1 * | 6/2012 | Teer | B60N 2/929 | 297/337 |
| 2013/0147249 A1 * | 6/2013 | Champ | B60N 2/3011 | 297/337 |
| 2013/0161993 A1 * | 6/2013 | Otsuka | B60N 2/22 | 297/354.12 |
| 2015/0375646 A1 * | 12/2015 | Lee | B60N 2/20 | 297/463.1 |
| 2016/0159253 A1 * | 6/2016 | Frasher | B60N 2/995 | 296/65.01 |
| 2016/0169327 A1 * | 6/2016 | Fujita | B60N 2/2227 | 297/361.1 |
| 2016/0242555 A1 * | 8/2016 | Aigner | A47C 7/407 | |
| 2016/0304010 A1 * | 10/2016 | Ecker | B60N 2/933 | |
| 2017/0001543 A1 * | 1/2017 | Dlugokecki | B60N 2/10 | |
| 2017/0197526 A1 * | 7/2017 | Salvia, III | B60N 2/206 | |
| 2017/0240068 A1 * | 8/2017 | Ramachandra | B60N 2/1615 | |
| 2018/0001790 A1 * | 1/2018 | Erbacher | B60N 2/06 | |
| 2018/0194251 A1 * | 7/2018 | Kreuels | B60N 2/20 | |
| 2018/0244176 A1 * | 8/2018 | Matsui | B60N 2/30 | |
| 2018/0251050 A1 * | 9/2018 | Damerow | B60N 2/72 | |
| 2018/0339628 A1 * | 11/2018 | Kimura | B60N 2/3047 | |
| 2018/0339629 A1 * | 11/2018 | Kimura | B64D 11/0643 | |
| 2019/0092191 A1 * | 3/2019 | Bouzid | B60N 2/164 | |

* cited by examiner

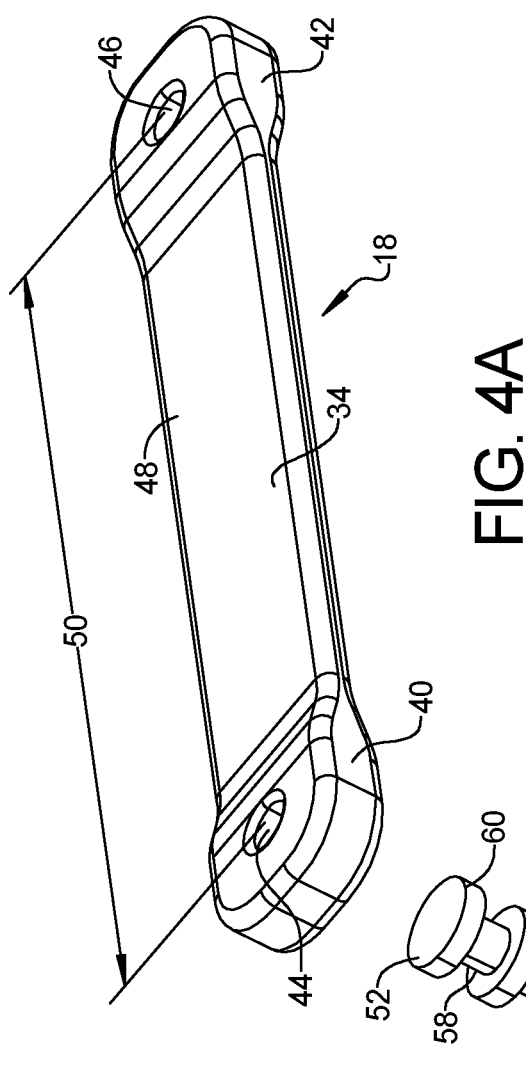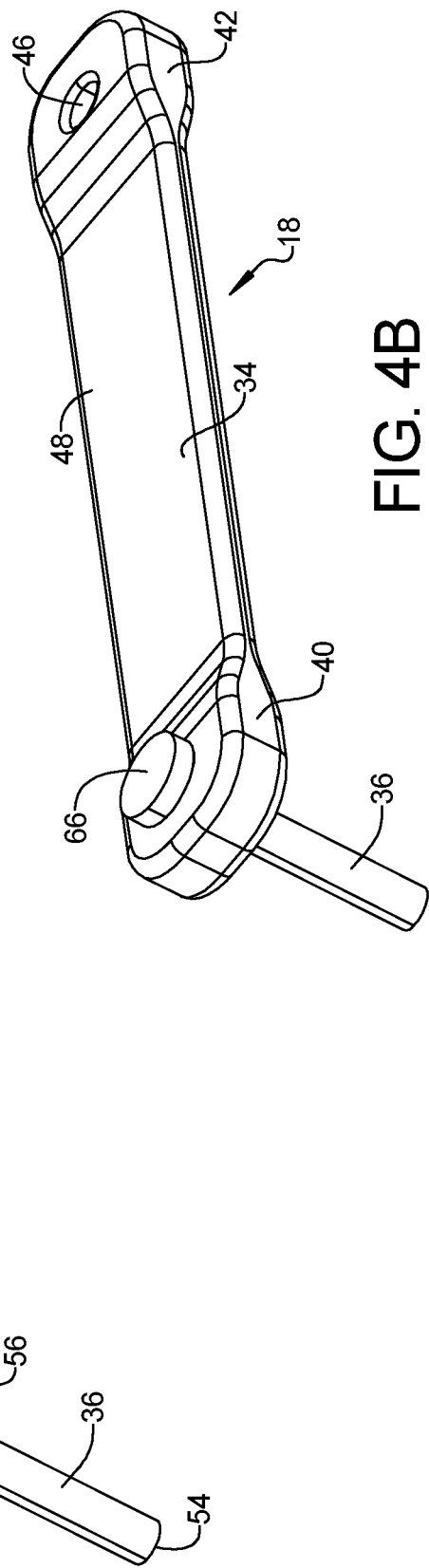

LATCHING SYSTEM FOR A VEHICLE SEAT

FIELD

The present disclosure relates to latching systems and, more particularly, to a latching system for use with a movable vehicle seat.

BACKGROUND

This section provides background information related to the present disclosure which is not necessarily prior art.

Vehicles can include seats that move, pivot, or flip relative to a pivot point. For example, a seat base can be flipped or pivoted from a down position to an up position to expose storage areas or provide a pass through. Seat backs can be pivoted from an up position for a use to a down position to provide a storage platform.

In order to maintain the desired positions for the seat base and the seat back, various mechanical latches and gas shocks have been used. These mechanisms, however, tend to require many working pieces that can increase cost, weight, complexity, and reliability for such latches. Therefore, it would be desirable to provide a more cost effective and less complex seat latch system that reduces the number of working parts and increases overall reliability for latching portions of a vehicle seat into a desired position.

SUMMARY

This section provides a general summary of the disclosure, and is not a comprehensive disclosure of its full scope or all of its features.

A seat latching system for use in latching a movable seat portion. The seat latching system includes a first fastener that is attached to a first location and a second fastener that is attached to a second location. An elongated resilient strap extends from a first end to a second end. The elongated resilient strap has a first coupling at the first end that attaches to the first fastener and a second coupling at the second end that attaches to the second fastener. The elongated resilient strap allows the movable seat portion to move between a first position and a second position while the elongated resilient strap is under tension.

A seat latching system having a movable seat portion that pivots about a pivot point from a first position to a second position. The seat latching system includes a first fastener attached to the movable seat portion at a first location and a second fastener attached to a fixed member at a second location. An elongated resilient strap extends from a first end to a second end. The elongated resilient strap has a first coupling at the first end that attaches to the first fastener and a second coupling at the second end that attaches to the second fastener. The elongated strap has a first untensioned length and a second tensioned length when the strap is attached to the first and second fasteners at the first and second locations such that the second tension length is greater than the first untensioned length. The elongated strap enables the movable seat portion to move between the first position and the second position with the strap under tension.

The seat latching system includes a movable seat base that pivots about a first pivot point from a first position to a second position and a movable seat back that pivots about a second pivot point between a third position and a fourth position. A first elongated resilient strap attaches to the movable seat base at a first location and to a fixed member at a second location to place the first strap under tension. A second elongated resilient strap attaches to the movable seat back at a third location and to a fixed member at a fourth location to place the second resilient strap under tension. The first elongated strap enables the movable seat base to move between the first position and the second position with the first strap under tension. The second elongated strap enables the movable seat back to move between the third position and the fourth position with the second elongated strap under tension.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4A is an exploded perspective view of the latching system for a vehicle seat of the present disclosure;

FIG. 4B is an assembled perspective view of the latching system for a vehicle seat of the present disclosure;

Corresponding reference numerals indicate corresponding parts throughout the several views of the drawings.

DETAILED DESCRIPTION

Example embodiments will now be described more fully with reference to the accompanying drawings.

Figure 1:
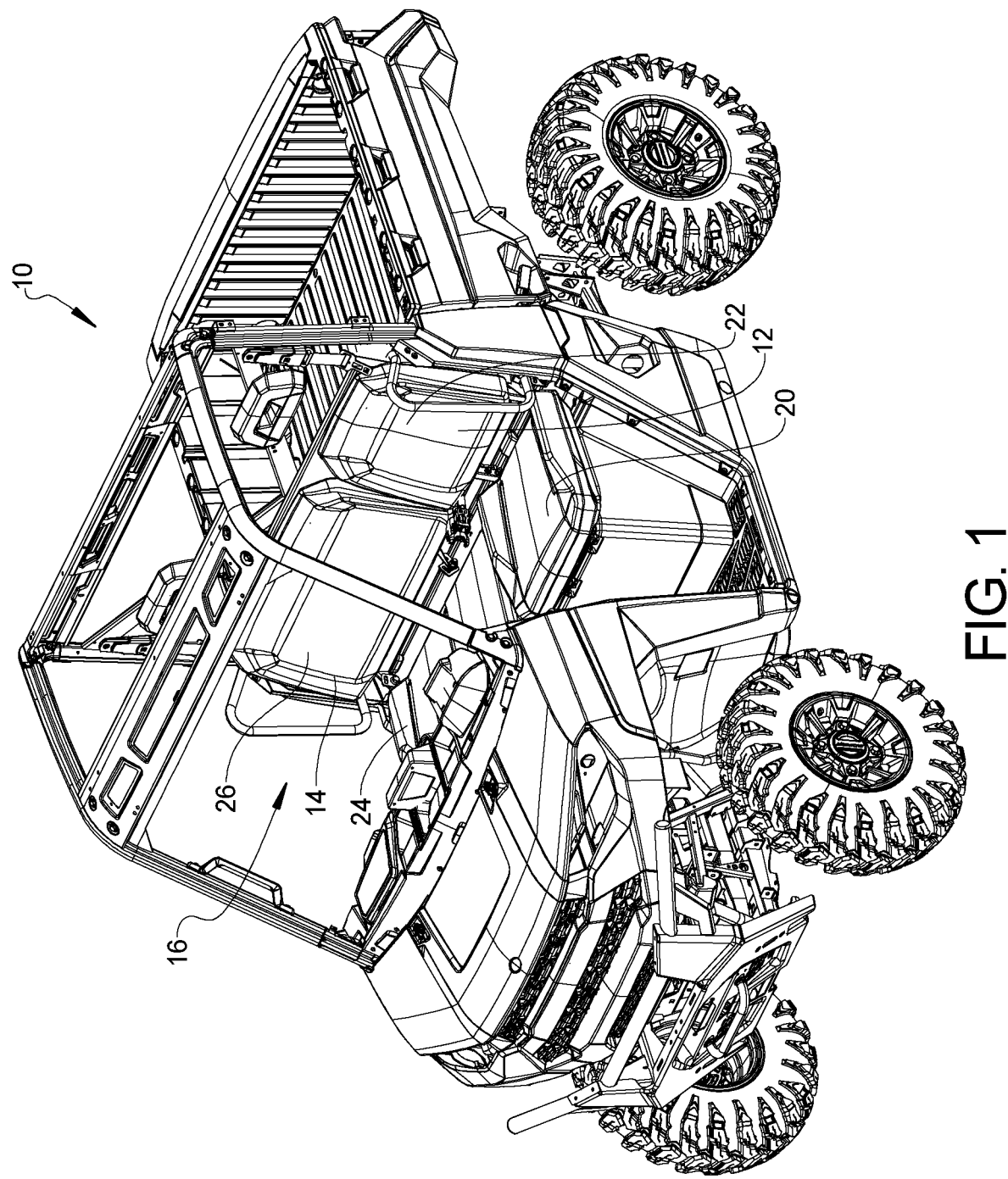
FIG. 1 is a perspective view of an exemplary vehicle.
Figure 2:
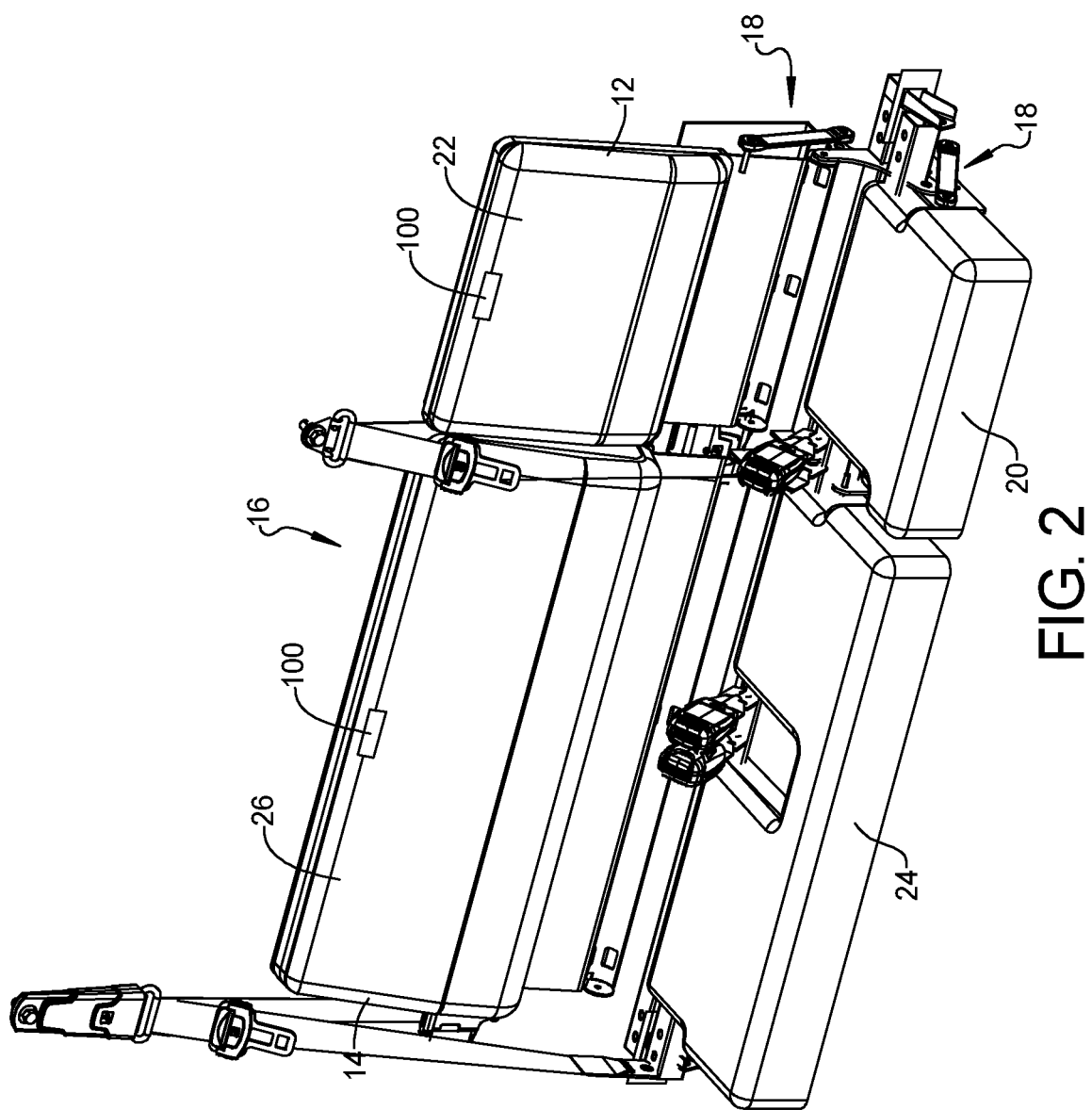
FIG. 2 is a perspective view of an exemplary vehicle seat configuration employing a latching system.

Referring to FIGS. 1 and 2, an exemplary vehicle 10 having a driver seat 12 and a bench-style passenger seat 14 is illustrated. While the vehicle 10 is illustrated as having a single row of seats, the vehicle 10 can include multiple rows of seats, such as a first front row and a second rear row. The exemplary vehicle illustrated is a utility vehicle, such as a Polaris Ranger vehicle of Medina, Minn. Any other type of exemplary vehicle that includes vehicle seats can also employ the latch system of the present disclosure.

Figure 3:
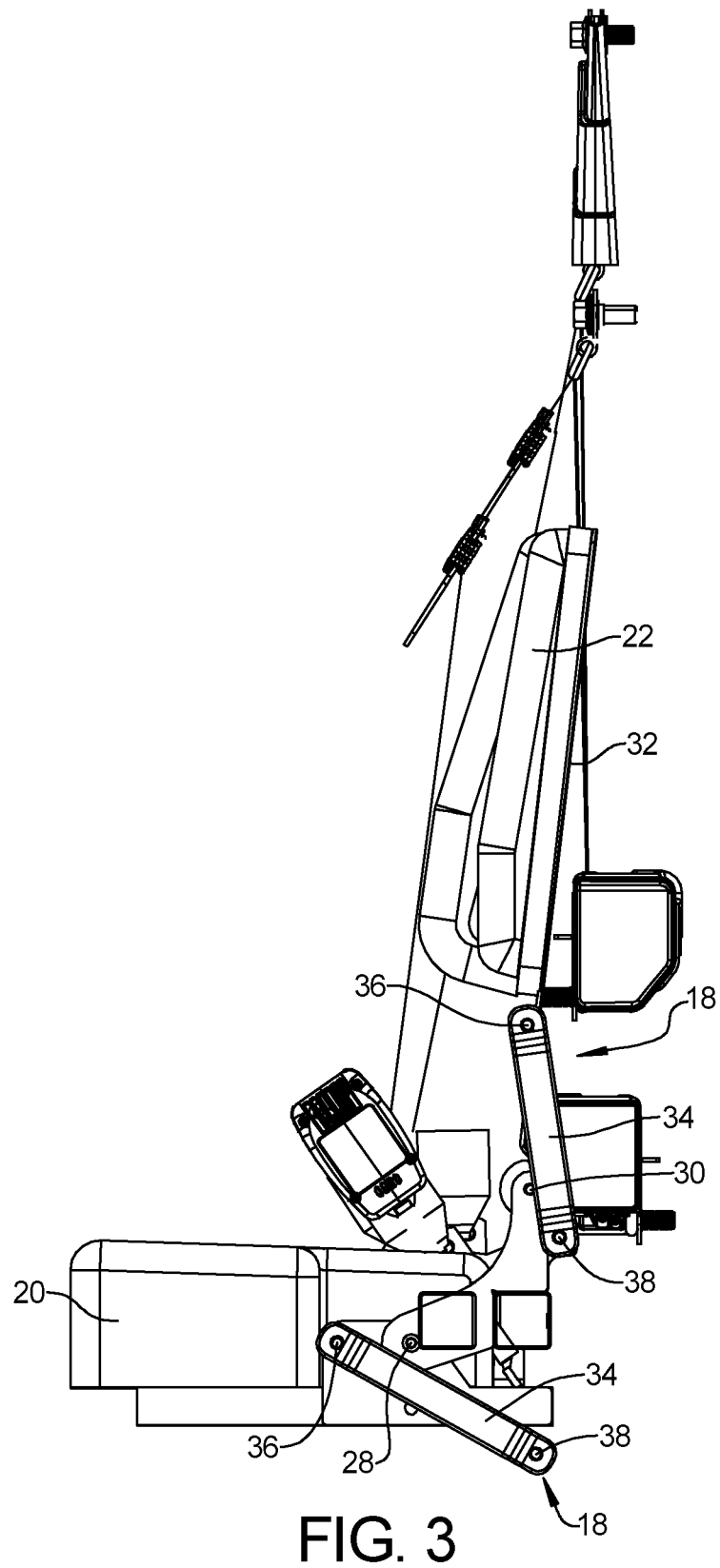
FIG. 3 is a side view of the seat configuration and latching system of FIG. 2.
Figure 9C:
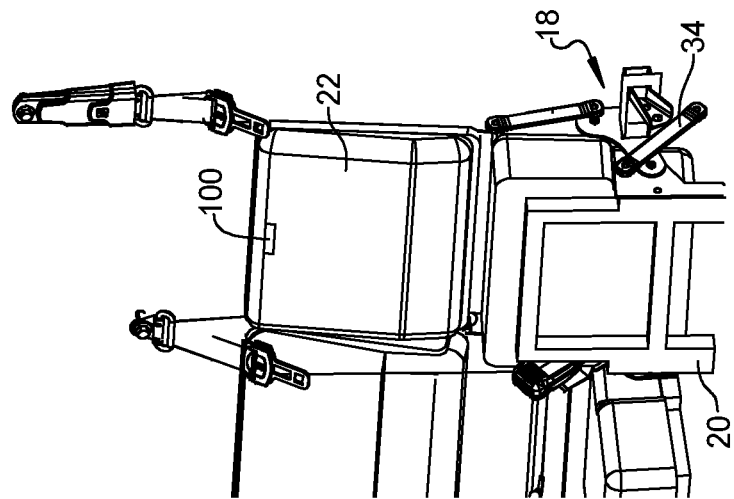
FIG. 9A-9C are perspective views of a seat base in a fully down, intermediate, and fully up position utilizing the latching system.
Figure 9B:
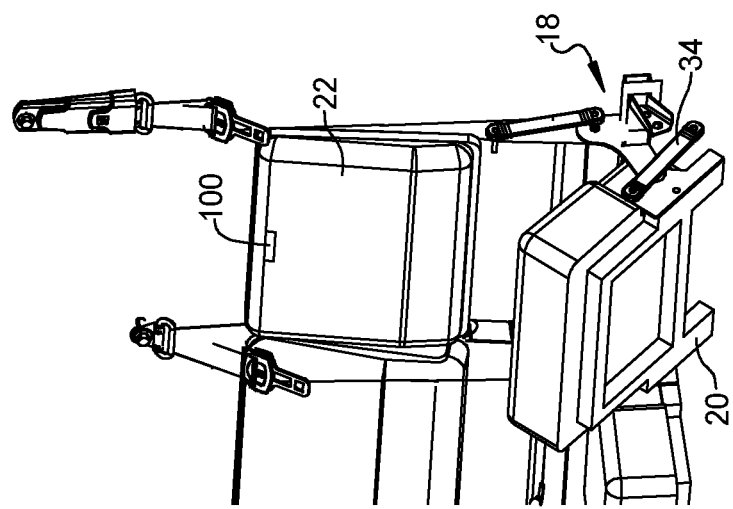
Figure 9A:
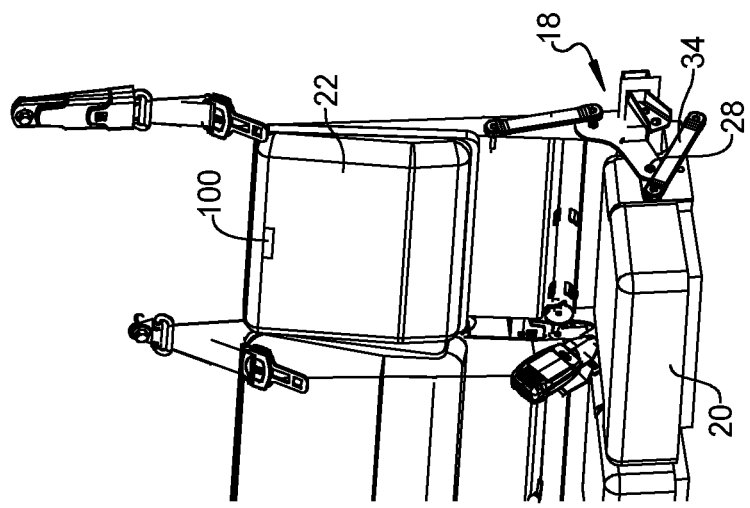

As illustrated in FIG. 2, the seat configuration 16 includes the single driver seat 12 and a two-person passenger seat 14. Both the driver seat 12 and the passenger seat 14 each employ a latching system 18 according to the present disclosure. The driver seat 12 includes a driver seat base 20 and a driver seat back 22. The passenger seat 14 includes a dual passenger seat base 24 and a dual passenger seat back 26. Each seat base 20 and 24 pivot about a base pivot point 28, as shown clearly in FIG. 3. This pivot or hinge point 28 enables each seat base 20 and 24 to be pivoted or flipped from a first down position, as illustrated in FIGS. 2 and 3, to a second up position, as exemplarily illustrated in FIGS. 9C and 10C. Moving the seat bases 20 and 24 from the down or extended position to a folded up position enables access to storage, vehicle components, such as batteries, or accessories, such as coolers, or a pass through area in the vehicle 10 to allow occupants to easily enter and exit the vehicle.

Figure 11C:
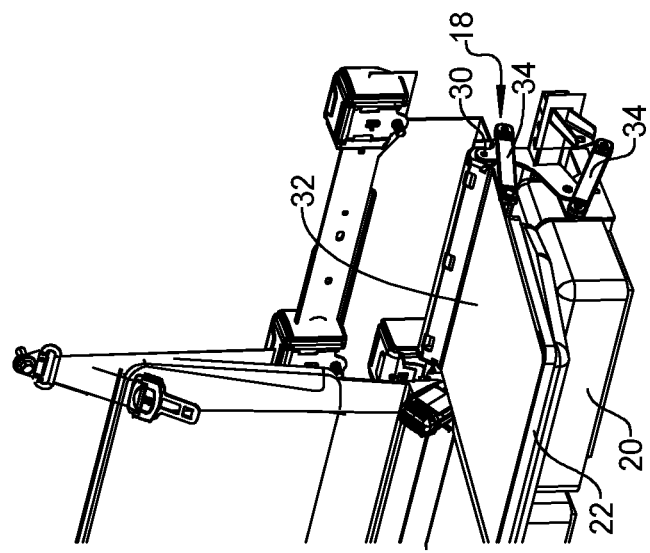
FIGS. 11A-11C are perspective views of a seat back in a fully up, intermediate, and fully down position utilizing the latching system.
Figure 11B:
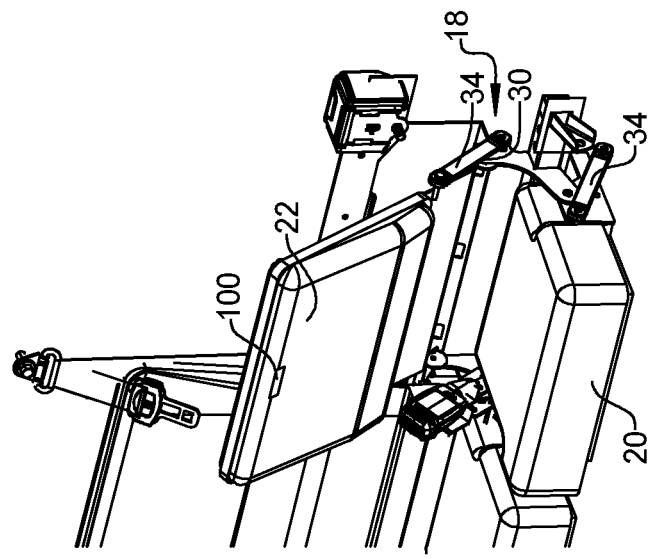
Figure 11A:
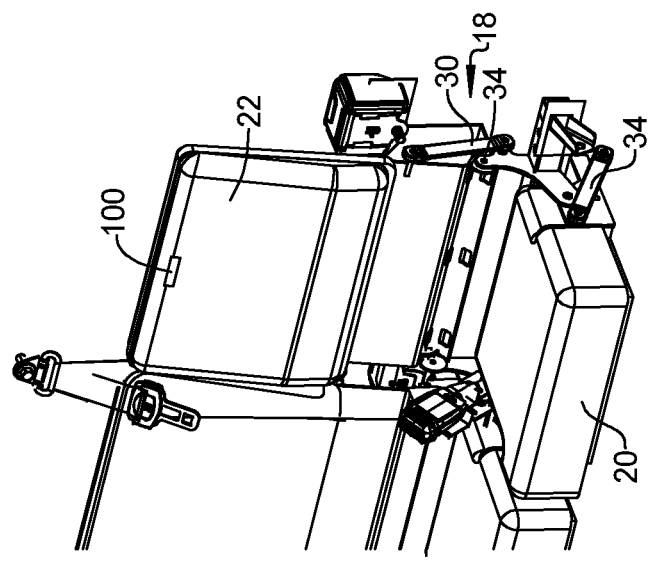

Each seat back 22 and 26 pivot or hinge about pivot point 30, as also illustrated in FIG. 3. This enables each seat back 22 and 26 to be positioned in its first upright user position for seating and retaining passengers to a second lowered position, as exemplarily illustrated in FIGS. 11C and 12C. In the lowered position, each seat back provides for a storage platform 32. This storage platform 32 enables gear or accessories to be placed within the vehicle 10 or enable movement around or within the vehicle 10. For example, the driver seat back 22 can be retained upright for the driver, while the passenger seat back 26 can be folded down providing the storage platform 32 on the passenger side for allowing elongated cargo to fit within the vehicle 10, as known in the art.

As illustrated in FIGS. 2 and 3, the driver seat base 20 includes one latching system 18 and the driver seat back 22 includes one latching system 18, each positioned on a side of the seat base 20 and seat back 22, as illustrated. The passenger seat base 24 includes a pair or two latching systems 18, one positioned on each side of the seat base 24 similar to the latching system 18 positioned on the seat base 20, except that it is on both opposed sides. The dual latching system 18 is provided to accommodate for the larger seat base 24 having additional weight as compared to the seat base 20. The passenger seat back 26 also includes a pair or two latching systems 18 on each side of the seat back 26 similar to the latching system 18 associated with the seat back 22. Again, providing two latching systems 18, one on each side of the seat back 26, accommodates for the additional size and weight of the two-person seat back 26. In discussing the operation of the latching system 18 associated with a seat base and associated with a seat back will be done in reference to the driver seat base 20 and the driver seat back 22 with the understanding that the passenger seat base 24 and the passenger seat back 26 will operate in the same manner with the corresponding latching systems 18, except that they will have two latching systems 18, one on each side of the corresponding base 24 and back 26.

Upon further reference to FIGS. 4A and 4B, an embodiment of the latching system 18 is shown in further detail. The latching system 18 includes a resilient linkage or strap 34, a first fastener 36, and a second fastener 38 (see FIG. 3).

As illustrated in FIGS. 4A and 4B, the resilient strap 34 is an elongated strap that extends from a first end 40 to a second end 42. Located at the first end 40 is a first coupling or bore 44 and located at the second end 42 is a second coupling or bore 46. The first coupling or bore 44 is defined within the first end 40 and the second coupling or bore 46 is defined within the second end 42. Positioned between the first and second couplings 44 and 46 is a resilient linkage portion 48 that extends about a relaxed, or tensioned, or first length 50. As illustrated, the first end 40 and the second end 42 are thicker than the resilient linkage portion 48 so that the resilient linkage portion 48 can be easily stretched and expanded along its axial length. The resilient linkage or strap 34 is formed of rubber or any other appropriate resilient material. By having a thicker region at the first end 40 and the second end 42, this provides for sufficient strength to retain the resilient strap 34 relative to the first fastener 36 and the second fastener 38, further discussed herein.

The fastener 36, which is substantially identical to the fastener 38, is an elongated fastener that extends from a first end 52 to a second end 54. The first end 52 includes an annular bearing shoulder 56, a cylindrical bearing surface 58, and a retaining head 60. The diameter of the bore 44 substantially corresponds to the diameter of the cylindrical bearing portion 58 so as to be rotatably positioned on the bearing portion 58 once assembled, as shown in FIG. 4B. The retaining head 60 is illustrated as disc-shaped and is sized so that the resilient linkage strap 34 and, particularly, first end 40 can be stretched to expand over the retaining head 60 at the bore 44 to snappingly connect the resilient linkage strap 34 to the fastener 36. The annular bearing shoulder 56 and the retaining head 60 capture the first end 40 on the bearing portion 58. The second end 54 is configured for fastening to either the seat base 20 or seat back 22 by way of any conventional attachment, such as threads, riveting, welding, etc. The fastener 36 is formed of metal and can include a low friction plastic coating on the bearing portion 58. An exemplary fastener 36 can be the Knorr glide bushing, as known in the art, manufactured by NOR-GLIDE® of Saint-Gobain, France. As illustrated in FIGS. 3 and 4B, each fastener 36 and 38 pass through corresponding bores 44 and 46, respectively, to capture or retain the resilient strap 34 relative to the first fastener 36 and the second fastener 38.

Figure 5A:
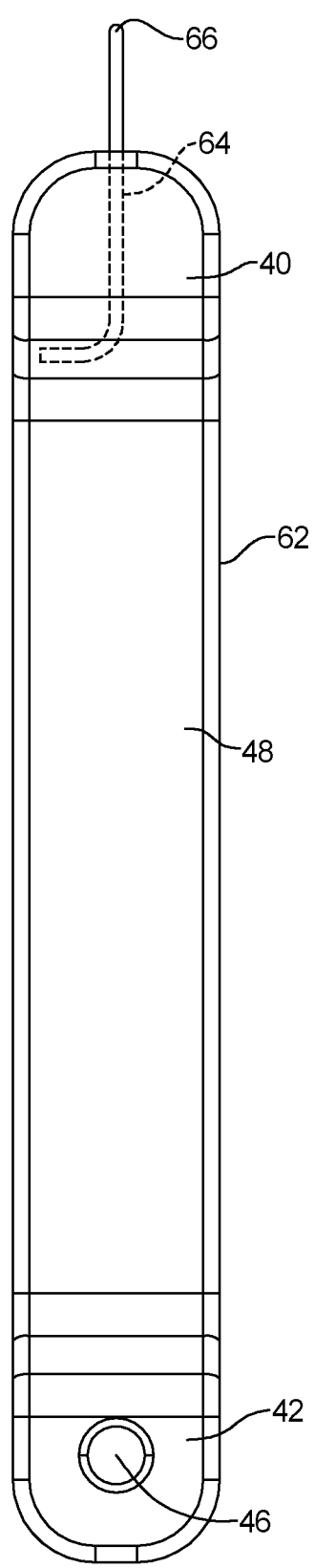
FIG. 5A is a front elevational view of another embodiment of the latching system.
Figure 5B:
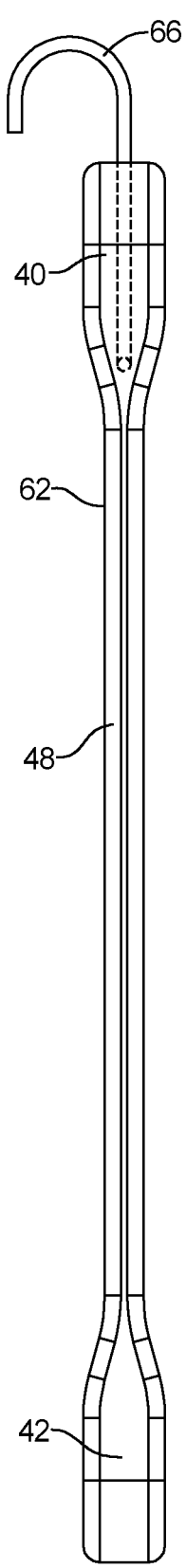
FIG. 5B is a side view of the latching system of FIG. 5A.

Turning to FIGS. 5A and 5B, a resilient linkage strap 62, according to another embodiment, is illustrated. The resilient linkage strap 62 is substantially similar to the linkage strap 34 and, accordingly, like reference numerals will be used to identify like structures except for the differences. The resilient linkage strap 62, again, extends from the first end 40 to the second end 42 and includes the resilient linkage portion 48 therebetween. The first end 40, however, as illustrated, replaces the bore 44 with an integrally molded fastener or hook 64. The integrally molded fastener 64 includes an exposed distal hook end 66. The hook end 66 is configured to hook about the cylindrical bearing portion 58 of fastener 36. Alternatively, the hook 66 can simply be hooked into a hole, further discussed herein, that is formed into the seat base 20, the seat back 22, or the vehicle 10. Additionally, while the integral molded hook 64 is shown positioned only at the first end 40, it will be understood that the second coupling or bore 46 can also be replaced with a corresponding integrally molded hook 64.

Figure 6:
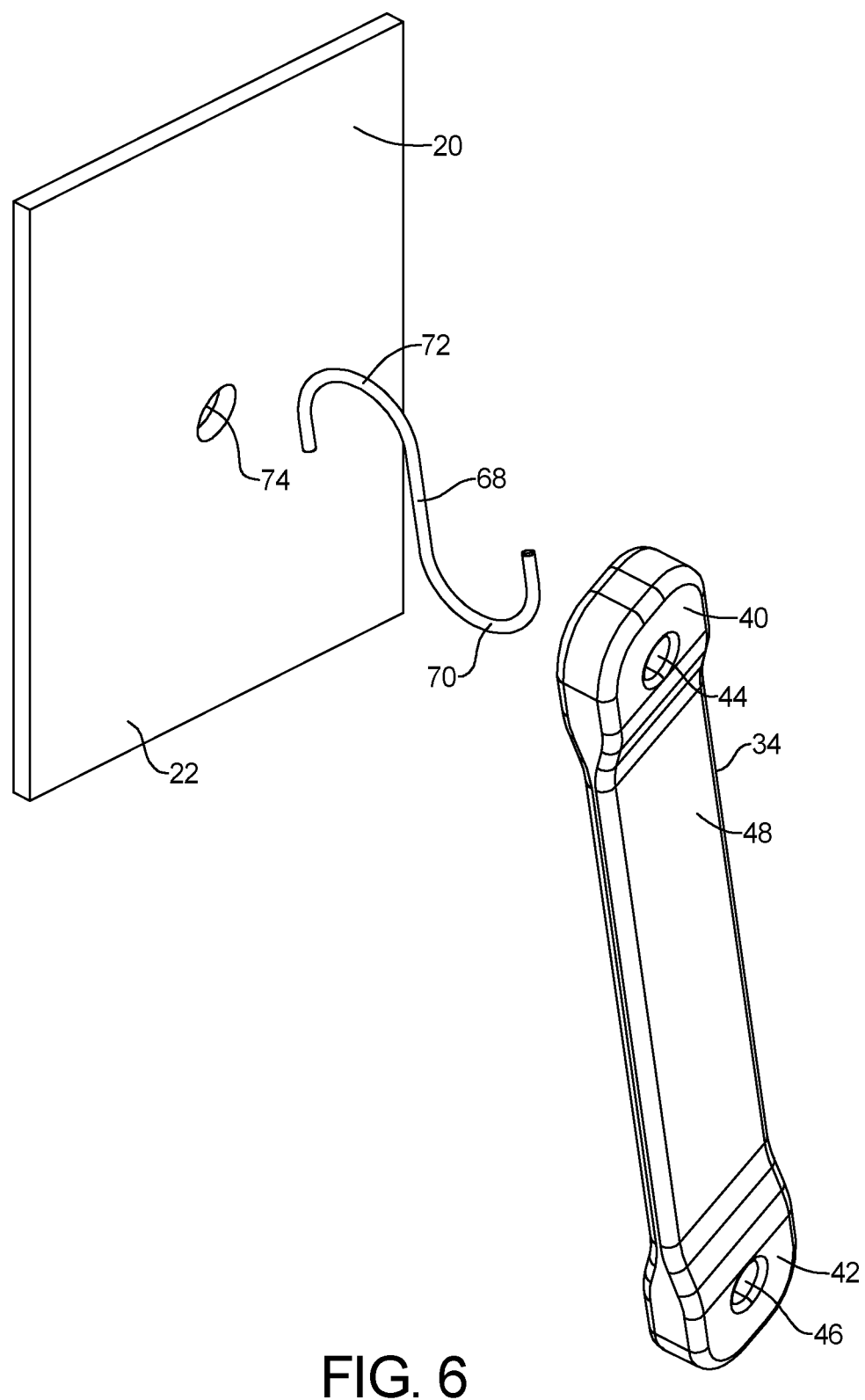
FIG. 6 is an exploded perspective view of another embodiment of the latching system.

Referring to FIG. 6, the resilient linkage strap 34 is, again, illustrated with a separate S-shaped fastener 68. The S-shaped fastener 68 includes a strap engaging hook 70 and a vehicle or seat engaging hook 72. The strap engaging hook 70 is configured to be passed through first coupling or bore 44 and the vehicle engaging hook 72 is configured to pass through and attach to a bore 74 that can be formed into any appropriate location relative to the seat base 20 or the seat back 22. Alternatively, the hook 72 can, again, be hooked on bearing portion 58. Additionally, while the hook 68 is shown in bore 44, the hook 68 can also be used in bore 46. The integral molded hook 64 and the S-shaped fastener 65 can each be formed of an appropriate metal or other material.

Figure 7A:
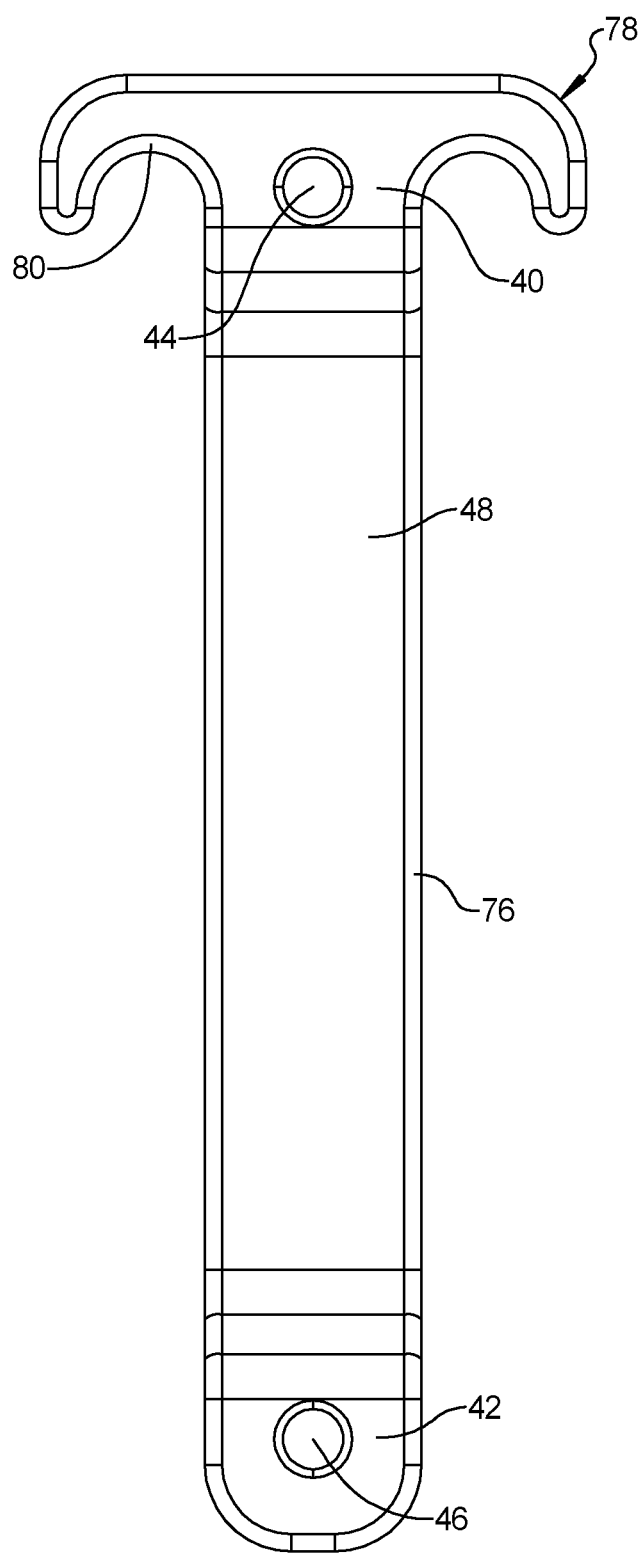
FIG. 7A is a front elevational view of another embodiment of the latching system.
Figure 7B:
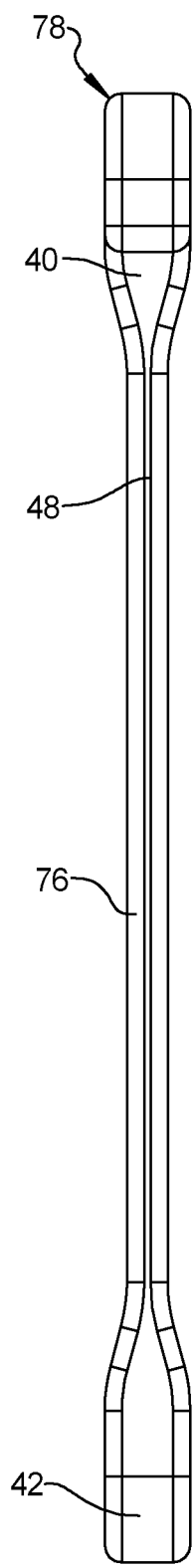
FIG. 7B is a side view of the latching system of FIG. 7A.

Referring to FIGS. 7A and 7B, an additional resilient strap 76 is illustrated that is substantially similar to the resilient strap 34, except for the noted differences herein. As illustrated, the first end 40 of the resilient strap 76 includes a gripping feature 78 that includes a T-shaped end having a pair of finger grips 80. The gripping feature 78 enables and assists in attaching the resilient strap 76 relative to the first fastener 36 and the second fastener 38. Specifically, the second end 42 having the bore 46 can be resiliently snapped over the second fastener 38 and a user can engage the pair of finger grips 80 to stretch and tension the resilient linkage portion 48 so that the bore 44 can be attached to the first fastener 36 while maintaining the resilient strap 76 under tension, further discussed herein.

Figure 8A:
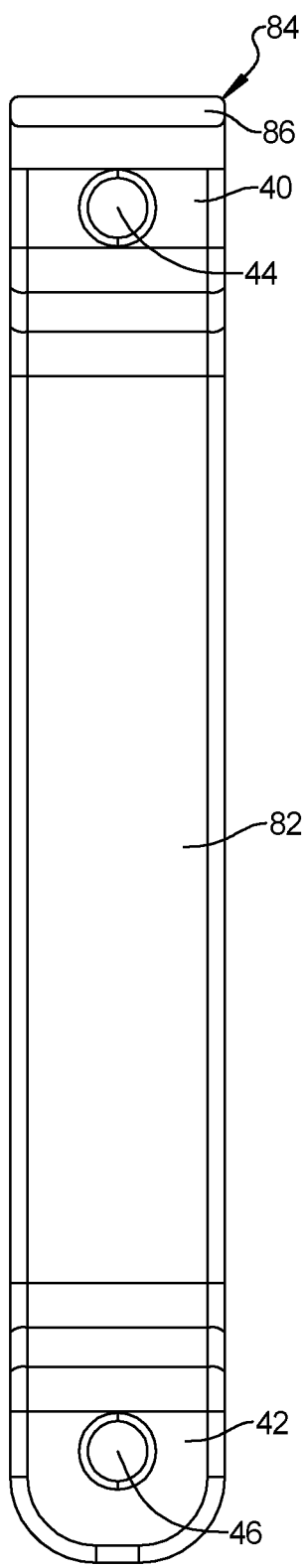
FIG. 8A is a front elevational view of another embodiment of the latching system.
Figure 8B:
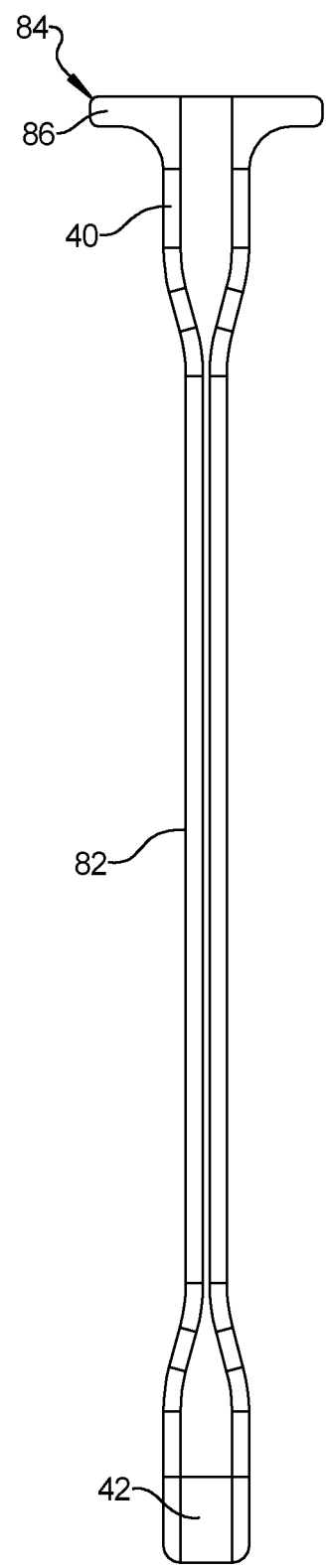
FIG. 8B is a side view of the latching system of FIG. 8A.

In reference to FIGS. 8A and 8B, an additional resilient strap 82, also having a gripping feature 84, is illustrated. The gripping feature 84 is positioned at the first end 40 of the resilient strap 82 and also provides for a T-shape in the side view, as illustrated in FIG. 8B, and includes a pair of opposed elongated flanges 86 that extend along the width of the resilient strap 82. Here again, this enables a user to attach the second end 42 to the second fastener 38 and grasp the first end 40 by way of the flanges 86 to stretch and tension the resilient strap 82 to align the bore 44 to the first fastener 36 and attach thereto. This provides for the strap 82 being held under tension.

Figure 10A:
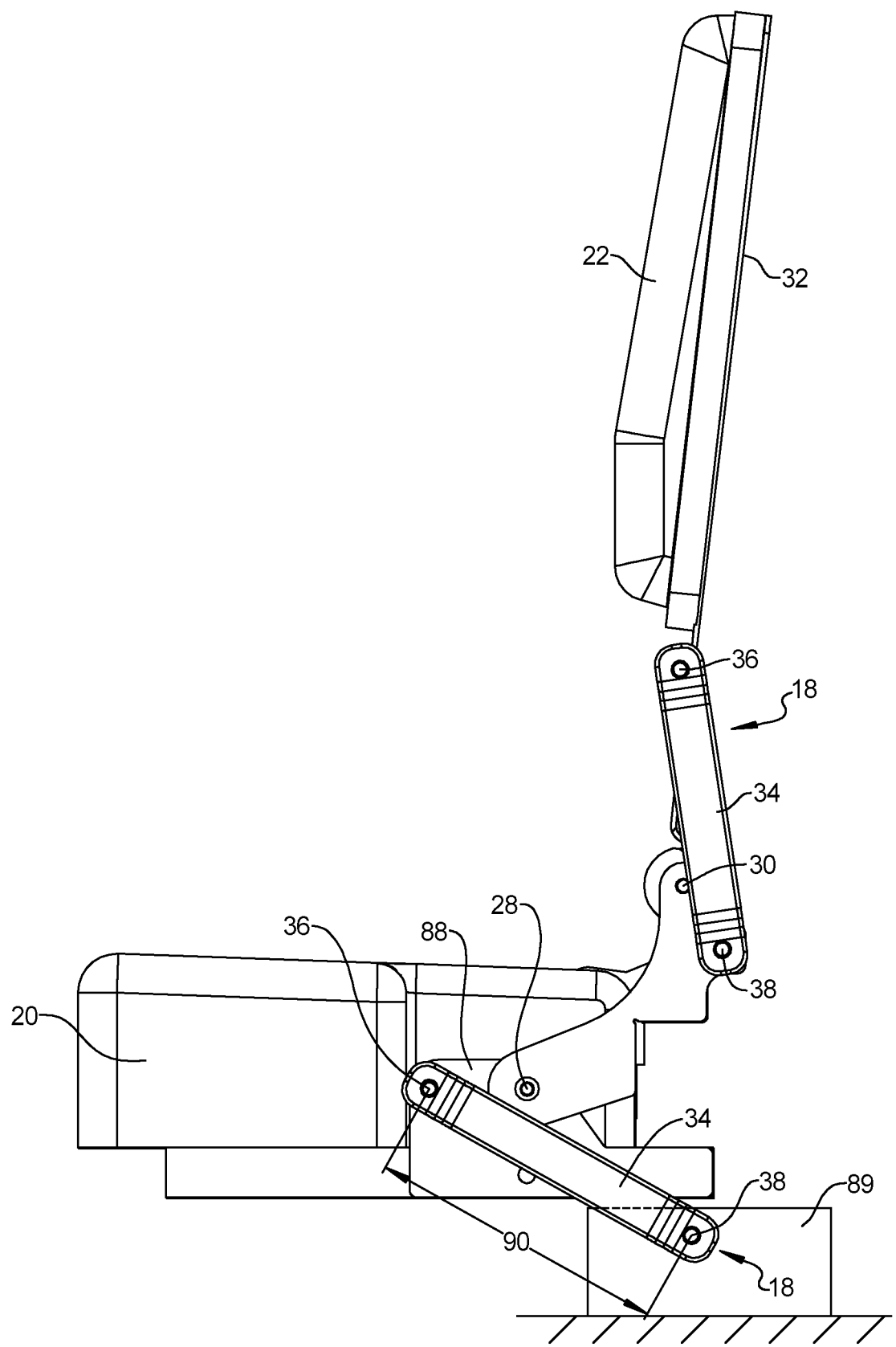
FIGS. 10A-10C are side views of the seat base in the fully down, intermediate, and fully up position utilizing the latching system.
Figure 10B:
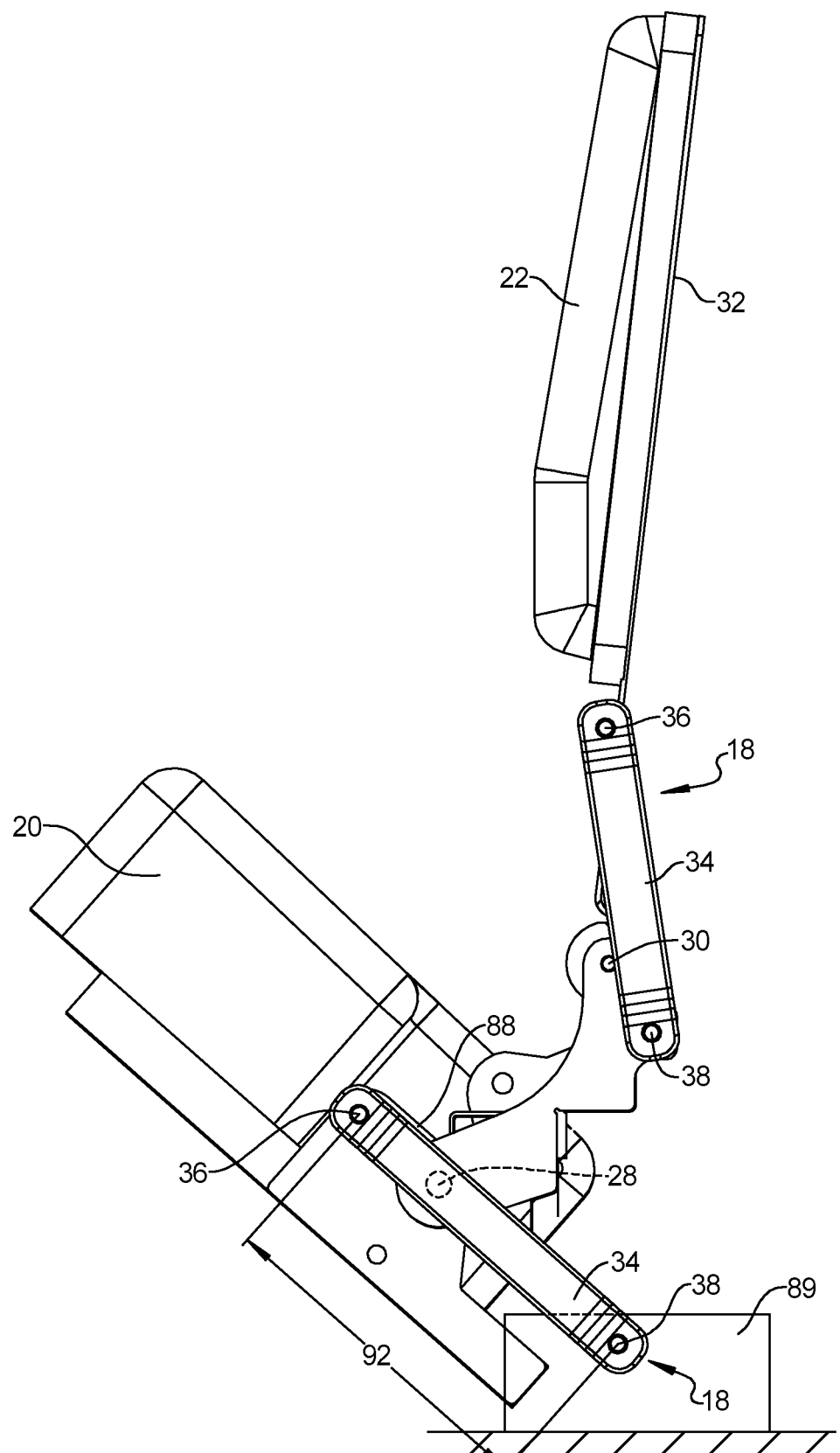
Figure 10C:
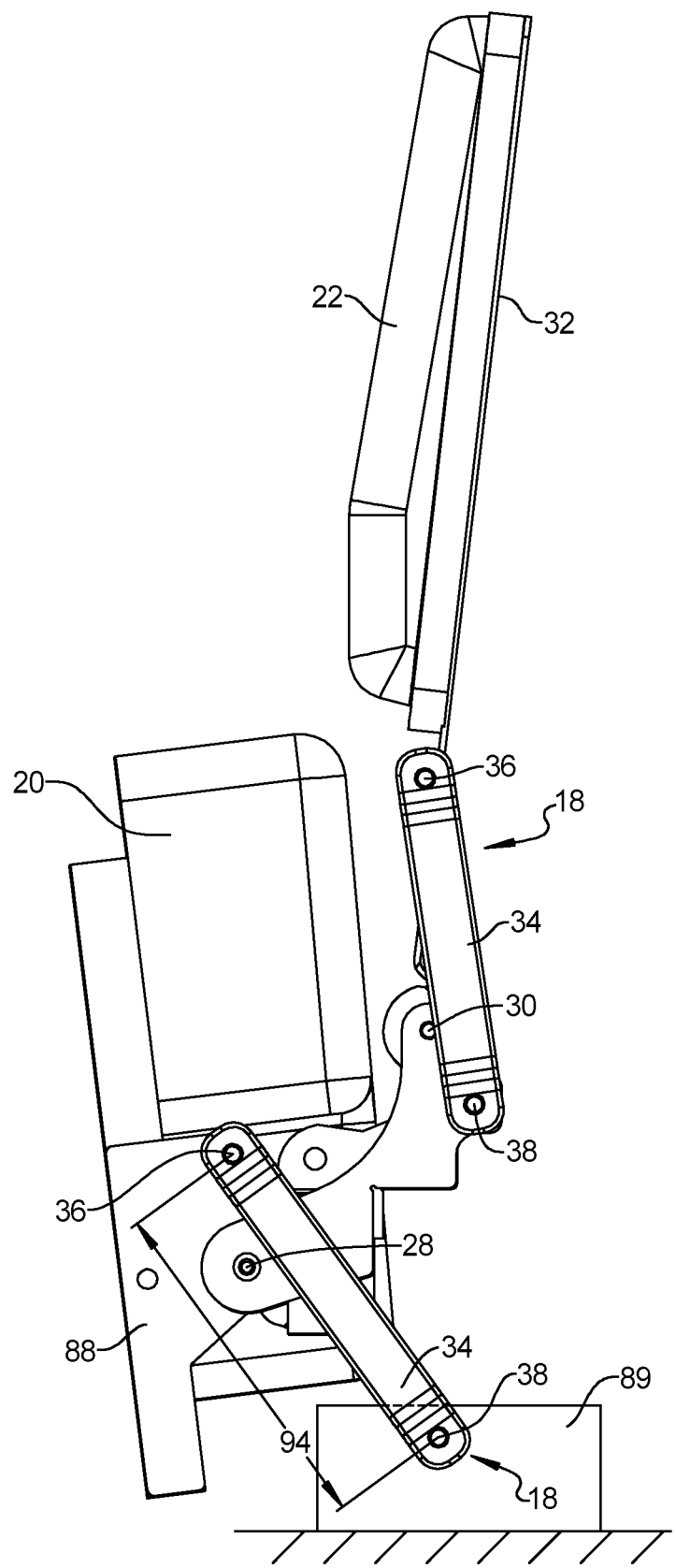

Referring now to FIGS. 9A-9C and 10A-10C, use of the resilient linkage or strap 34 is illustrated as it relates to the driver seat base 20. Again, while the driver seat base 20 is illustrated, the passenger seat base 24 would operate in the same fashion, except that two resilient linkage straps 34 would be used as opposed to only one where each strap is on each side of the passenger seat base 24 due to the additional weight. Referring to FIG. 10A, the seat base 20 is illustrated in the first down position similar to that illustrated in FIG. 9A. The seat base 20 pivots about the seat base pivot point 28 so as to enable the seat base 20 to be moved from the down position, as shown in FIG. 10A, to the full upright position, as shown in FIG. 10C, with the intermediate position shown in FIG. 10B.

The resilient strap 34 is illustrated attached to the first fastener 36 and the second fastener 38. The first fastener 36 is coupled at a first movable location to the seat base 20 and, particularly, a movable frame portion 88 of the seat base 20. The second fastener 38 is attached and fixed at a second fixed location, particularly a floor frame 89 of the vehicle 10 relative to the seat base 20. In the first position, as illustrated in FIG. 10A, the resilient strap 34 has been elongated and is under tension having a length 90 that is longer than the length 50 when the strap 34 is not under tension. For example, the at rest length 50 can be about 130 mm and the tensioned length 90 can be about 154 mm. By putting the strap 34 under tension, this holds the seat base 20 in the first down position to prevent the seat from bouncing or vibrating during normal use and drivability of the vehicle 10. As illustrated in FIG. 10A, with the fastener 36 at the first location and the fastener 38 at the second location as set out above, the resilient strap 34 is positioned below and on one side of the pivot point 28, as illustrated in FIG. 10A.

Should a user desire to move the seat base 20 upward, the user would simply grasp the seat base 20 and lift the front of the seat base 20 so that the seat base 20 pivots about pivot point 28, as illustrated in FIG. 10B. This will elongate the resilient strap 34 to a maximum length 92 of about 163 mm. At this position, shown in FIG. 10B, the resilient strap 34 is under the most tension due to the further elongation of the strap 34. Continuing rotation of the seat base 20 to the full upright or second position, as shown in FIG. 10C, results in the elongation of the strap 34 to be reduced to a length 94 of about 151 mm. This length 94 is similar to the length 90 and will maintain the seat base 20 in its second upright position, as illustrated in FIG. 10C. Additionally, as noted in FIG. 10C, the resilient strap 34 is now positioned above or on the opposite side of pivot point 28 when the seat base 20 is in its second upright position.

By providing the elongated strap 34 mounted in this configuration, as illustrated, a camming action is provided such that the seat base 20 naturally moves to the distinct first down and second upright positions where the tension is the least compared to the maximum tension in its fully intermediate position, as shown in FIG. 10B. Thus, by having the first fastener 36 movable attached to the frame 88 and the second fastener 38 non-movably fixed to the floor frame 89 and the pivot point 28 positioned therebetween and spaced from the resilient strap 34, camming action is created by maintaining the resilient strap 34 under tension when the seat base 20 is in the first down position, as well as throughout movement to the first up position, where the maximum tension is in the intermediate position as illustrated in FIG. 10B. This enables the seat base 20 to be easily toggled between the first down and the second up position and also enables the seat base 20 to be maintained in the first and second positions since the resilient strap is still under tension to hold the seat base 20 in these positions. The seat base 20 will tend to migrate to or automatically move to the first and second positions based on the maximum tension being at the intermediate portion, as shown in FIG. 10B.

Such a system eliminates various more complex latching systems, such as gas shocks that have increased weight and complexity and also additional wear concerns. The latching system 18 utilizing the resilient linkage or strap 34 provides a cost-effective design to hold the seat base 20 in the first down position and/or the second up position, where the resilient linkage portion 48 stretches to act like a cam to keep the seat in both of these distinct up and down positions and under tension in these positions to prevent bouncing or excess movement of the seat base 20.

Figure 12A:
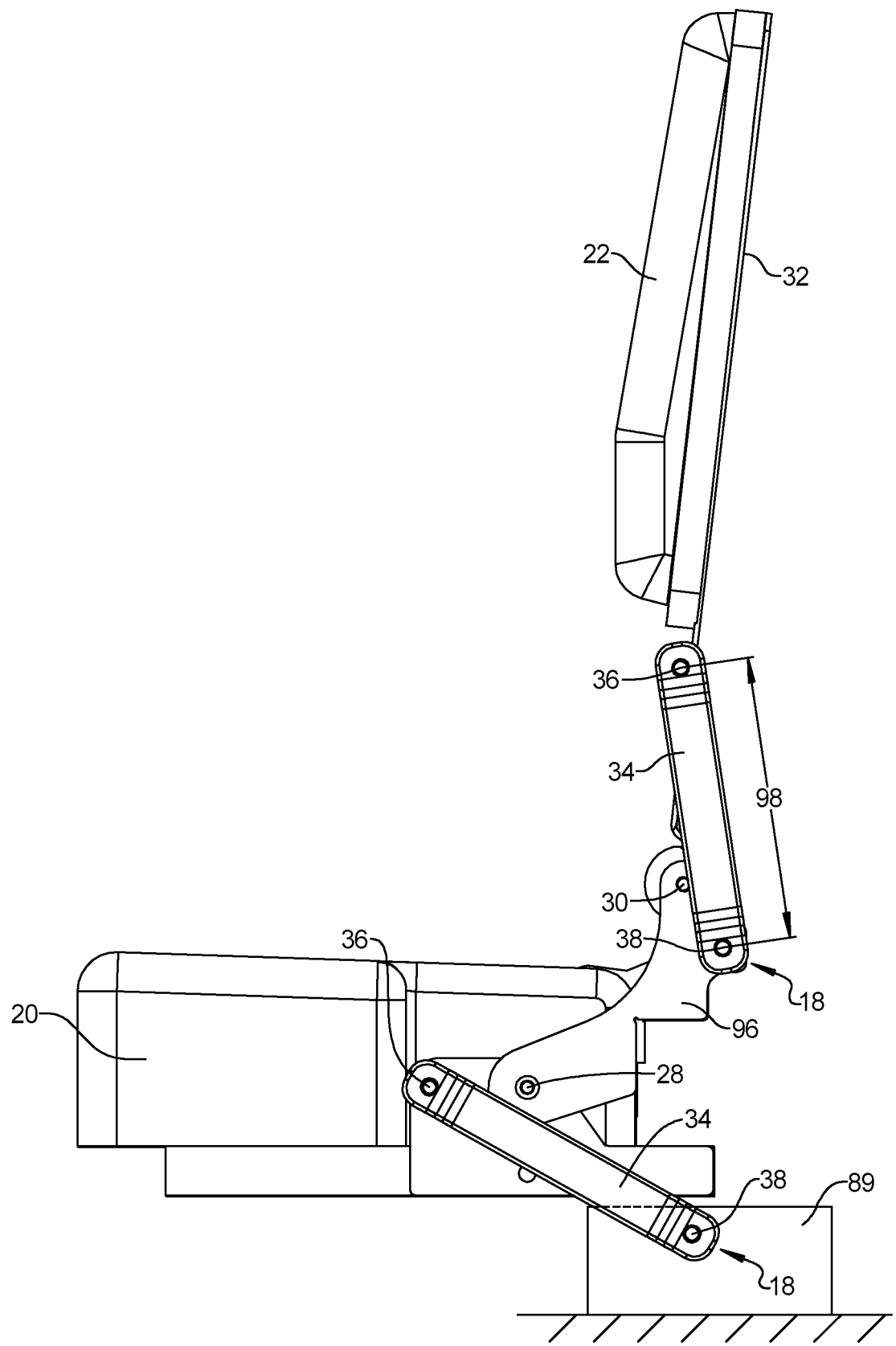
FIGS. 12A-12C are side views of a seat back in a fully up, intermediate, and fully down position utilizing the latching system.
Figure 12B:
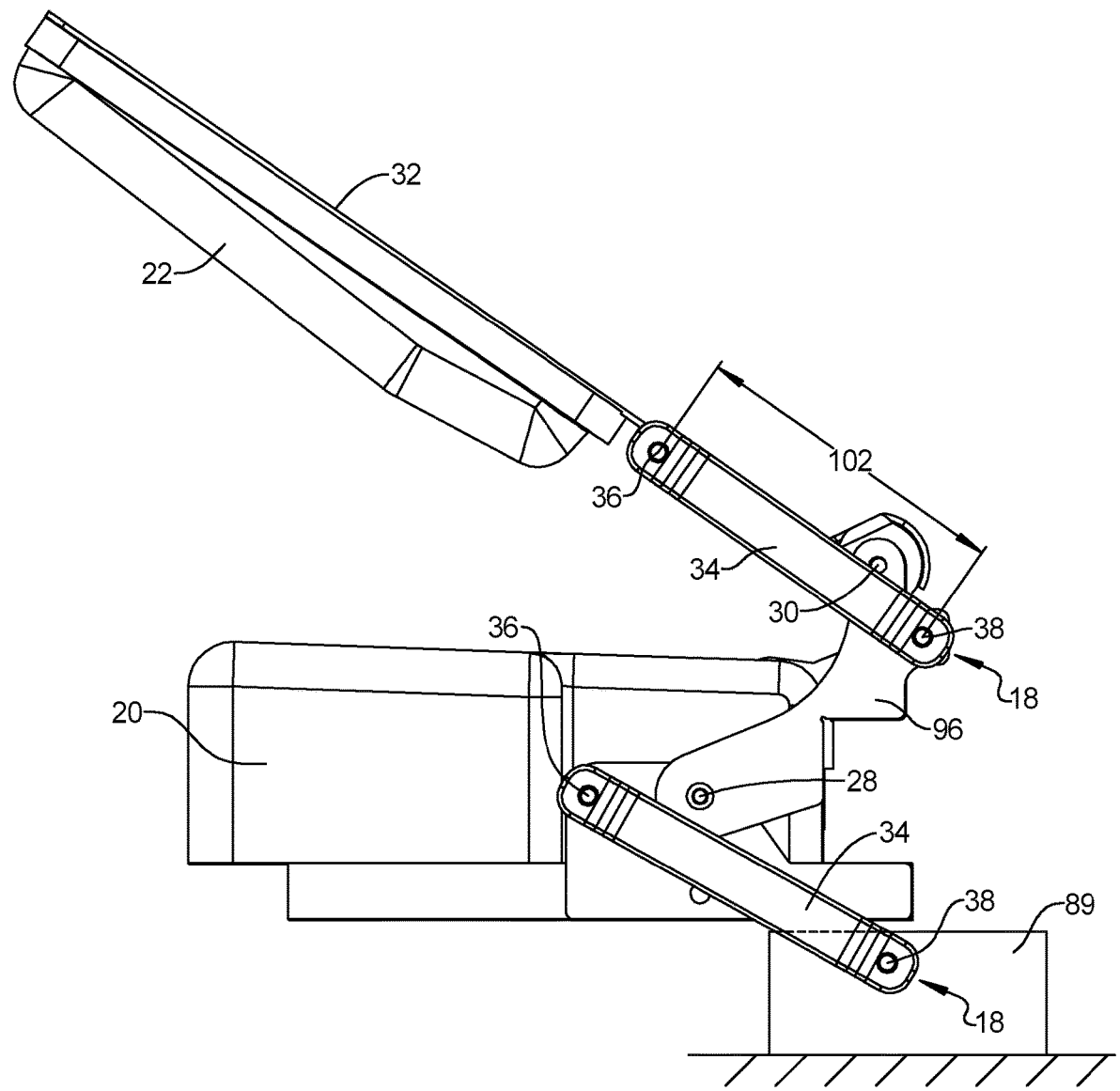
Figure 12C:
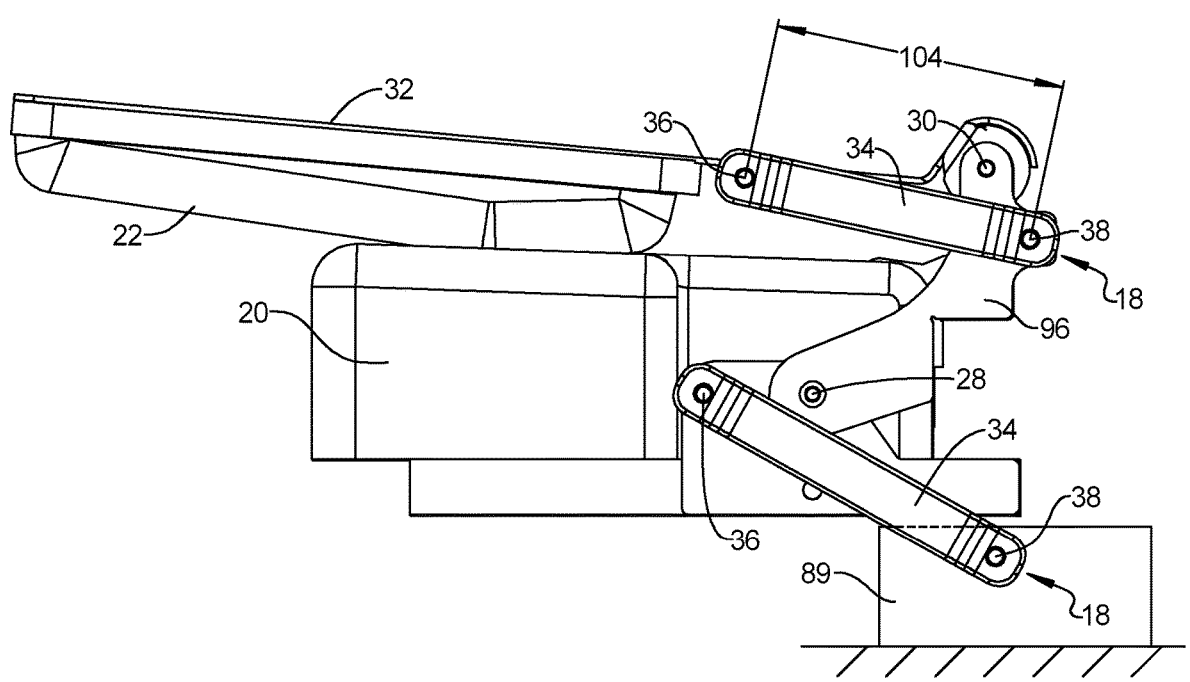

Turning now to FIGS. 11A-11C and 12A-12C, the driver seat back 22 will now be discussed in relation to the second latching system 18. Here again, the driver seat back 22 will operate the same as the passenger seat back 26, except that two latching systems 18 will be used. The driver seat back 22 can be moved from a first upright position, as illustrated in FIG. 12A, to a second fully down position, as illustrated in FIG. 12C, with the intermediate position illustrated in FIG. 12B. As illustrated in FIG. 12A, the resilient strap 34 of the latching system 18 is, again, attached to the first fastener 36 at a first movable location that is attached to the seat back 22 and the second fastener 38 is attached at a second fixed location to a stationary frame portion 96. The seat back 22, again, pivots or moves about pivot point 30, as illustrated. In the upright position, as illustrated in FIG. 12A, the seat back 22 stretches the resilient strap 34 to a length 98 of about 145 mm, compared to the relaxed length 50 of 130 mm. In the upright position, the tension on the strap 34 substantially maintains the seat back 22 in the upright position. To provide further retaining of the seat back 22 in the upright position, a supplemental latch 100, as illustrated in FIG. 2, can be used. In this position, the resilient strap 34 is again on one side of the pivot point 30.

Should the user desire to lower the seat back 22, the latch 100 can be engaged to release the seat back 22 from its first upright position and the user can simply grasp the top of the seat back 22 and begin pulling the seat back downward, as illustrated in FIG. 12B. In this position, a maximum length 102 of the resilient strap 34 is about 150 mm, creating the largest tension and the camming action, as discussed above. Moving the seat back 22 to the second fully down position, as illustrated in FIG. 12C, creates the storage platform 32 and, the length 104 of the resilient strap 34 is at about 134 mm or similar to the tension when the seat back 22 is in the first position. In this position, the resilient strap 34 has been moved from the first side of the pivot point 30 to an opposed second side of the pivot point 30 as illustrated in FIG. 12C. This configuration of movement creates the camming action so that the seat back 22 can be positioned into the first and second positions or automatically drawn into these positions based on the corresponding tension created in these positions as compared to the maximum tension created when in the intermediate position, as illustrated in FIG. 12B.

Again, this configuration provides for two distinct positions relative to the central camming action based on the elongation and tension created with the resilient strap 34 in order to hold and retain the seat back 22 in the first upright and second down position. This enables both the seat base 20 and the seat back 22 to be automatically biased or positioned in their corresponding up and down positions based on the tension that holds the seat base 20 and seat back 22 primarily in the up and down positions due to the noted camming effect. This is based upon the resilient strap 34 being fixed to a statically located fastener 38 relative to the moving fastener 36 that is attached to the moving member being either the seat base 20 or the seat back 22 and relative to a pivot point 28 or 30 being remote from the fixation points. Such a position causes the resilient strap 34 to move from one side of a pivot point to an opposed second side of the pivot point creating the camming effect. Additionally, by pre-tensioning the resilient strap 34 in either its up or down position, provides for the automatic biasing into these positions where the tension in these positions is lower than the tension in the most intermediate position, thereby directing or causing the seat base 20 or seat back 22 to want to naturally or automatically move into either the first or second positions being either upright or down. Such a latching system 18 improves upon existing systems by way of reduced costs, simplicity, reliability, and handling by a user. Again, while the above description illustrates the resilient strap 34, any of the other resilient straps 62, 76, and 82 may also be utilized in the same manner and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat latching system for use in latching a movable seat portion, comprising:
   a first fastener configured to be attached to a first location;
   a second fastener configured to be attached to a second location; and
   an elongated resilient strap extending from a first end to a second end, the elongated resilient strap having a first coupling at the first end configured to attach to the first fastener, the elongated resilient strap having a second coupling at the second end configured to attach to the second fastener;
   wherein the elongated resilient strap enables the movable seat portion to move between a first position and a second position with the elongated resilient strap under tension;
   wherein the elongated resilient strap includes at least one enlarged gripping feature extending from the first end of the elongated resilient strap configured to enable gripping of the elongated resilient strap by a user to place the elongated resilient strap under tension;
   wherein the at least one enlarged gripping feature is a T-shaped section at the first end of the elongated resilient strap.

2. The seat latching system of claim 1, wherein the first coupling is a first bore defined within the first end of the elongated resilient strap configured to rotatably engage a first bearing surface on the first fastener.

3. The seat latching system of claim 2, wherein the first fastener includes an enlarged head larger than a diameter of the first bore, wherein the first coupling is configured to resiliently snap over the enlarged head to engage the first bearing surface.

4. The seat latching system of claim 1, wherein the elongated resilient strap includes a first thickness at the first end and a second thickness at the second end and a third thickness between the first and second ends where the third thickness is less than the first and second thicknesses.

5. The seat latching system of claim 1, wherein the elongated resilient strap is formed from rubber.

6. The seat latching system of claim 1, wherein the elongated resilient strap has a first relaxed and non-tensioned length and a second tensioned length when the elongated resilient strap is attached to the first and second fasteners at the first and second locations and the movable seat portion is in the first position, the second tensioned length is greater than the first relaxed and non-tensioned length.

7. The seat latching system of claim 6, wherein the elongated resilient strap has a third fully tensioned length when the movable seat portion is positioned between the first and second positions to provide a camming effect on the movable seat portion.

8. The seat latching system of claim 1 wherein the first location is a first movable location on the seat portion and the second location is a second fixed location relative to the movable seat portion, where the movable seat portion pivots about a pivot point and the elongated resilient strap is on one side of the pivot point with the movable seat portion at the first position and on an opposite opposed side with the movable seat portion at the second position.

9. A seat latching system, comprising:
   a movable seat portion that pivots about a pivot point from a first position to a second position;
   a first fastener attached to the movable seat portion at a first location;
   a second fastener attached to a fixed member at a second location; and
   an elongated resilient strap extending from a first end to a second end, the elongated resilient strap having a first coupling at the first end configured to attach to the first fastener, the elongated resilient strap having a second coupling at the second end configured to attach to the second fastener;

wherein the elongated resilient strap has a first untensioned length and a second tensioned length when the elongated resilient strap is attached to the first and second fasteners at the first and second locations, where the second tensioned length is greater than the first untensioned length;

wherein the elongated resilient strap enables the movable seat portion to move between the first position and the second position with the elongated resilient strap under tension;

wherein the elongated resilient strap is positioned on a first side of the pivot point with the movable seat portion in the first position and the elongated resilient strap is configured to be positioned on a second opposite side of the pivot point with the movable seat portion in the second position.

10. The seat latching system of claim 9, wherein the first fastener includes an enlarged head and a spaced apart annular shoulder with a cylindrical bearing portion therebetween and the first coupling is a first bore defined within the first end of the elongated resilient strap, wherein the enlarged head is larger than a diameter of the first bore, wherein the first coupling is configured to resiliently snap over the enlarged head to engage the cylindrical bearing surface.

11. The seat latching system of claim 9, wherein the elongated resilient strap has a third fully tensioned length when the movable seat portion is between the first position and the second position, where the third fully tensioned length is greater than the first untensioned length and the second tensioned length to provide a camming effect on the movable seat portion.

12. The seat latching system of claim 9, wherein the movable seat portion is a movable seat base movably attached to a vehicle.

13. The seat latching system of claim 9, wherein the movable seat portion is a seat back movably attached to a vehicle and the fixed member is a portion of a seat frame.

14. A seat latching system, comprising:
a movable seat base that pivots about a first pivot point from a first position to a second position;
a movable seat back that pivots about a second pivot point from a third position to a fourth position;
a first elongated resilient strap attached to the movable seat base at a first location and to a fixed member at a second location to place the first elongated resilient strap under tension;
a second elongated resilient strap attached to the movable seat back at a third location and to a fixed member at a fourth location to place the second elongated resilient strap under tension;
wherein the first elongated resilient strap enables the movable seat base to move between the first position and the second position with the first elongated strap under tension;
wherein the second elongated resilient strap enables the movable seat back to move between the third position and the fourth position with the second elongated strap under tension;
wherein the first elongated resilient strap is positioned on a first side of the first pivot point with the movable seat base in the first position and the first elongated resilient strap is configured to be positioned on a second opposite side of the first pivot point with the movable seat base in the second position.

* * * * *